H. B. TUTTLE.
TIRE SAVING AUTOMOBILE JACK.
APPLICATION FILED AUG. 5, 1915.
1,196,995.
Patented Sept. 5, 1916.
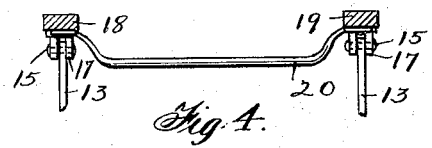
Fig. 4.
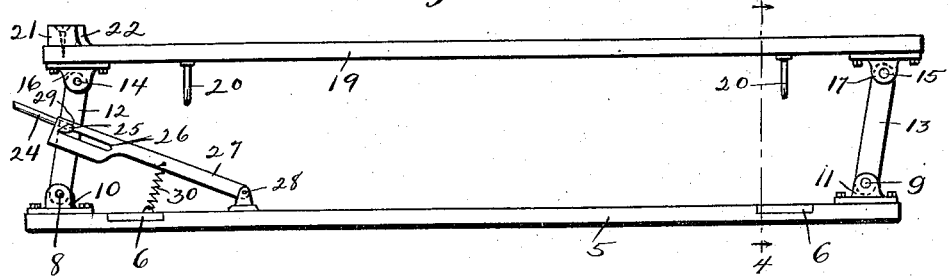
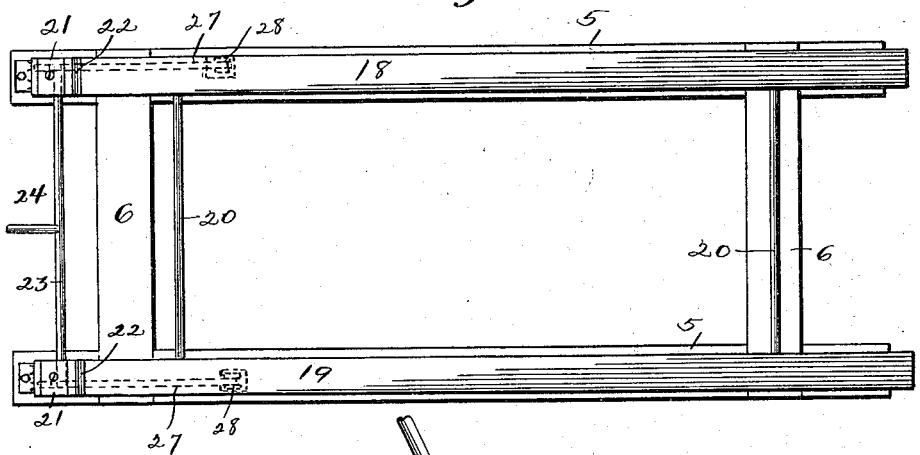
Inventor
H. B. Tuttle,
By 
his Attorney

UNITED STATES PATENT OFFICE.

HARVEY B. TUTTLE, OF LEBO, KANSAS.

TIRE-SAVING AUTOMOBILE-JACK.

1,196,995.

Specification of Letters Patent.

Patented Sept. 5, 1916.

Application filed August 5, 1915. Serial No. 43,760.

*To all whom it may concern:*

Be it known that I, HARVEY B. TUTTLE, a citizen of the United States, residing at Lebo, in the county of Coffey and State of Kansas, have invented certain new and useful Improvements in Tire-Saving Automobile-Jacks, of which the following is a specification.

This invention relates to tire saving automobile jacks of the type wherein the entire vehicle is lifted bodily from the floor when it enters the garage or other place of storage.

It is the primary object of the present invention to provide a jack of this type in which the elevation of the automobile is brought about by the bodily forward movement of said automobile, its momentum being such, when applied to my improved apparatus, as to cause the automobile to ride bodily upon said apparatus to such a position that the tires will be entirely free of the floor.

It is a well known fact that oil is highly injurious to rubber and the floors of garages are usually coated with oil or grease. Furthermore the pressure in the tires is very great and to be able to relieve the tires of the weight of the machine during all of the time that the machine is standing in the garage will lengthen the life of the tires.

I am aware of the fact that it has heretofore been proposed to provide structures adapted to accomplish the foregoing objects but the structure herein shown and described will be found to accomplish the objects sought in an extremely facile, economical and efficient way.

In the accompanying drawing: Figure 1 is a side elevation of a jack constructed in accordance with the invention. Fig. 2 is a plan view thereof, Fig. 3 is a detail view of the controlling latch with the parts in released position and Fig. 4 is a partial transverse sectional view upon line 4—4 of Fig. 1.

Like numerals designate corresponding parts in all of the figures of the drawing.

Referring to the drawing, the numerals 5 designate longitudinally disposed rails and the numerals 6 cross bars which secure said rails in spaced relation to each other and with said rails constitute a base for the jack. Pivoted at 8 and 9 in bearings 10 and 11 of the base are links or levers 12 and 13. The upper ends of the levers 12 and 13 are pivoted at 14 and 15 in bearings 16 and 17, carried by rails 18 and 19. These latter rails are the members which engage beneath the axles of the automobile to lift it from the ground, as hereinafter set forth.

The rails 18 and 19 are held in spaced relation to each other by downwardly bowed tie rods 20. Stop blocks 21 are mounted at the front ends of the rails 18 and 19 and have secured to their rear faces rubber cushioning pads 22.

A transverse rod 23, carrying an operating handle 24, is disposed at the front end of the jack and is provided upon its outer ends with dogs 25. The rod 23 passes through the front links or levers 12 and the dogs 25 are disposed in slots 26 of brace bars 27, the latter being pivoted at 28 to the base. The slots 26 are provided at their front ends with offside recesses 29 which at certain times receive the dogs as hereinafter set forth. Springs 30 tend to draw the brace bars downwardly.

In operation when an automobile is driven to a position overlying rails 18 and 19 the front axle of the automobile strikes the pads 22 of stop blocks 21 and the rails 18 and 19 are elevated by the levers 12 and 13 which tend to move into a vertical position. It is to be noted however that these levers never pass over the dead center but that upon the contrary they are stopped by the brace bars 27. When the points of the dogs 25 encounter the inclined front walls 26ᵃ of the slots 26 they are moved to the position shown in Fig. 1 at which time said dogs act as latches to hold the levers and rails 18 and 19 upon which the automobile is at this time supported, against retrograde movement. It will be apparent that the movement of the dogs to the position indicated will be accompanied by a turning movement of the rod 23 and that this will in turn move the handle 24 downwardly.

When it is desired to replace the machine upon the floor so that it may be used the handle 24 is lifted to the position shown in Fig. 3, which results in turning the rod 23 and causing the points of the dogs 25 to lift the front ends of the brace bars 27 against the tension of springs 30 until the long axes of the dogs lie in alinement with the slots, whereupon the levers 12 and 13 may rock rearwardly with the dogs sliding in said slots to bring the jack to its lowered position. It will likewise be noted that by virtue of having the parts so arranged that the levers never pass over the dead center the lowering of the jack is brought about entirely by the weight of the automobile, it being understood that it is necessary to raise the automobile very little in order to take the weight off of the tires.

It is to be understood that the invention is not limited to the precise construction disclosed but that it includes within its purview such changes as fairly come within the spirit of the appended claims.

Having described my invention what I claim is:

1. The combination with a rectangular base, of a plurality of levers pivoted at their lower ends to said base to swing in vertical planes, a vehicle supporting structure pivotally connected to the upper ends of said levers, brace bars pivoted at one of their ends to said base and having slots formed therein, the forward portions of said brace bars lying opposite the said levers at one end of the base, an operating rod mounted to turn in said levers and dogs carried by said operating rod and acting in said slots, said slots being of such length as to limit the forward movement of the vehicle supporting structure to prevent said levers from passing over the center.

2. The combination with a rectangular base, of a plurality of levers pivoted at their lower ends to said base to swing in vertical planes, a vehicle supporting structure pivotally connected to the upper ends of said levers, brace bars pivoted at one of their ends to said base and having slots formed therein, the forward portions of said brace bars lying opposite the said levers at one end of the base, an operating rod mounted to turn in said levers and dogs carried by said operating rod and acting in said slots, said slots being of such length as to limit the forward movement of the vehicle supporting structure to prevent said levers from passing over the center, each of said slots being provided with an off-set portion at its forward end of such shape as to engage behind said dogs and prevent reverse movement of the vehicle supporting structure until the operating rod is turned.

3. The combination with a rectangular base, of a plurality of levers pivoted at their lower ends to said base to swing in vertical planes, a vehicle supporting structure pivotally connected to the upper ends of said levers, brace bars pivoted at one of their ends to said base and having slots formed therein, the forward portions of said brace bars lying opposite the said levers at one end of the base, an operating rod mounted to turn in said levers and dogs carried by said operating rod and acting in said slots, said slots being of such length as to limit the forward movement of the vehicle supporting structure to prevent said levers from passing over the center, each of said slots being provided with an off-set portion at its forward end of such shape as to engage behind said dogs and prevent reverse movement of the vehicle supporting structure until the operating rod is turned, the forward walls of said slots being shaped to co-act with said dogs whereby when said dogs are turned by the movement of the operating rod, said brace bars will be moved to bring the remaining portions of said slots into such position that the dogs may travel rearwardly therein as and for the purpose set forth.

4. The combination with a rectangular base, of a plurality of levers pivoted at their lower ends to said base to swing in vertical planes, a vehicle supporting structure pivotally connected to the upper ends of said levers, brace bars pivoted at one of their ends to said base and having slots formed therein, the forward portions of said brace bars lying opposite the said levers at one end of the base, an operating rod mounted to turn in said levers and dogs carried by said operating rod and acting in said slots, said slots being of such length as to limit the forward movement of the vehicle supporting structure to prevent said levers from passing over the center, each of said slots being provided with an off-set portion at its forward end of such shape as to engage behind said dogs and prevent reverse movement of the vehicle supporting structure until the operating rod is turned, the forward walls of said slots being shaped to co-act with said dogs whereby when said dogs are turned by the movement of the operating rod, said brace bars will be moved to bring the remaining portions of said slots into such position that the dogs may travel rearwardly therein as and for the purpose set forth, and springs normally tending to draw said brace bars downwardly.

In testimony whereof I affix my signature in presence of two witnesses.

H. B. TUTTLE.

Witnesses:
 F. F. FOCKELE,
 J. C. COPPLE.